(12) United States Patent
Sela et al.

(10) Patent No.: US 12,182,454 B2
(45) Date of Patent: Dec. 31, 2024

(54) VIRTUAL BLOCK POOLS FOR PROTECTING DEVICE HEALTH

(71) Applicant: Western Digital Technologies, Inc., San Jose, CA (US)

(72) Inventors: Rotem Sela, Sunnyvale, CA (US); Asher Druck, Nahariya (IL)

(73) Assignee: Sandisk Technologies, Inc., Milpitas, CA (US)

( * ) Notice: Subject to any disclaimer, the term of this patent is extended or adjusted under 35 U.S.C. 154(b) by 32 days.

(21) Appl. No.: 18/123,436

(22) Filed: Mar. 20, 2023

(65) Prior Publication Data

US 2023/0305756 A1    Sep. 28, 2023

Related U.S. Application Data

(60) Provisional application No. 63/322,565, filed on Mar. 22, 2022.

(51) Int. Cl.
*G06F 3/06*    (2006.01)

(52) U.S. Cl.
CPC .......... *G06F 3/0665* (2013.01); *G06F 3/0619* (2013.01); *G06F 3/0683* (2013.01)

(58) Field of Classification Search
CPC ..... G06F 3/0665; G06F 3/0619; G06F 3/0683
See application file for complete search history.

(56) References Cited

U.S. PATENT DOCUMENTS

| 2013/0179624 A1* | 7/2013 | Lambert | G06F 12/0246 711/E12.008 |
|---|---|---|---|
| 2016/0062664 A1* | 3/2016 | Samuels | G06F 3/0679 711/103 |
| 2016/0239226 A1* | 8/2016 | Sunaga | G06F 3/0688 |
| 2017/0147238 A1* | 5/2017 | Dumov | G06F 12/0246 |
| 2019/0272115 A1* | 9/2019 | Hu | G06F 12/0238 |
| 2020/0004671 A1* | 1/2020 | Neufeld | G11C 16/10 |

OTHER PUBLICATIONS

Pletka, Roman A., and Saša Tomić. "Health-binning: Maximizing the performance and the endurance of consumer-level NAND flash." Proceedings of the 9th ACM International on Systems and Storage Conference. 2016. (Year: 2016).*

* cited by examiner

*Primary Examiner* — Nicholas J Simonetti
(74) *Attorney, Agent, or Firm* — PATTERSON + SHERIDAN, LLP

(57) ABSTRACT

A data storage device includes a memory device and a controller coupled to the memory device. The controller is configured to maintain a plurality of virtual pools, wherein each virtual pool corresponds with an logical block address (LBA) range, update a counter of a virtual pool, wherein the counter corresponds to a health of the LBA range, and select, based on the counter, the virtual pool to program data to. The controller is further configured to maintain a counter for each application having data programmed to the virtual pool, where the counter is increased for each write operation to the virtual pool. When the counter equals or exceeds a threshold value, the controller is configured to send a warning to each application associated with the virtual pool having the counter that equals or exceeds the threshold value.

15 Claims, 3 Drawing Sheets

| APPLICATION A 204a | APPLICATION B 204b | APPLICATION C 204c | APPLICATION D 204d | ... | APPLICATION n 204n |
|---|---|---|---|---|---|

MEMORY DEVICE 202

FIG. 2A

| LU 1 – 10% |
|---|
| LU 2 – 20% |
| LU x – 5% |

MEMORY DEVICE 252

APPLICATIONS A-n

FIG. 2B

VIRTUAL BLOCK POOLS FOR PROTECTING DEVICE HEALTH

CROSS-REFERENCE TO RELATED APPLICATION

This application claims benefit of U.S. Provisional Patent Application Ser. No. 63/322,565, filed Mar. 22, 2022, which is herein incorporated by reference.

BACKGROUND OF THE DISCLOSURE

Field of the Disclosure

Embodiments of the present disclosure generally relate to data storage devices, such as solid state drives (SSDs), and, more specifically, improving performance and endurance of a data storage device having a shared memory.

Description of the Related Art

A data storage device may be shared between multiple applications and/or host devices. For example, the data storage device may act as a centralized storage, where critical applications and non-critical applications share the same data storage device. However, when the data storage device is shared between multiple applications and/or host devices, malicious and/or misbehaved applications and/or host devices may wear out the memory device (e.g., flash storage) of the data storage device.

Furthermore, sharing memory between multiple applications and/or host devices may impose a security risk to the storage system in case a malicious application or a bug in the application wears out a logical unit (LU)/partition, such as a logical block address (LBA) range, which may lead to increased write amplification and, ultimately, wearing out the memory device. Thus, other applications may be impacted due to the endurance of the data storage device being impacted by the malicious application or the bug in the application. In other words, the data storage device may enter "end-of-life" conditions quicker than advertised.

Therefore, there is a need in the art for an improved data storage device having a shared memory between multiple applications and/or host devices.

SUMMARY OF THE DISCLOSURE

The present disclosure generally relates to data storage devices, such as solid state drives (SSDs), and, more specifically, improving performance and endurance of a data storage device having a shared memory. A data storage device includes a memory device and a controller coupled to the memory device. The controller is configured to maintain a plurality of virtual pools, wherein each virtual pool corresponds with an logical block address (LBA) range, update a counter of a virtual pool, wherein the counter corresponds to a health of the LBA range, and select, based on the counter, the virtual pool to program data to. The controller is further configured to maintain a counter for each application having data programmed to the virtual pool, where the counter is increased for each write operation to the virtual pool. When the counter equals or exceeds a threshold value, the controller is configured to send a warning to each application associated with the virtual pool having the counter that equals or exceeds the threshold value.

In one embodiment, a data storage device includes a memory device and a controller coupled to the memory device. The controller is configured to maintain a plurality of virtual pools, wherein each virtual pool corresponds with one or more logical block address (LBA) ranges or one or more logical units (LUs) of the memory device, update a counter of a virtual pool, wherein the counter corresponds to a health of the one or more LBA ranges or the one or more LUs, and send a warning to one or more applications associated with the virtual pool, wherein the one or more applications are associated with the one or more LBA ranges or the one or more LUs.

In another embodiment, a data storage device includes a memory device and a controller coupled to the memory device. The controller is configured to receive a write command to program data to the memory device from an application, wherein the application is associated with a virtual pool of a plurality of virtual pools of the memory device, and wherein one or more applications are associated with the virtual pool, program the data of the write command to the memory device, increase a count of a counter associated with the virtual pool, determine that the count is greater than or equal to a first threshold value, and send a warning to the application in response to determining that the count is equal to or greater than the first threshold value, wherein the warning indicates to the application that a health of the virtual pool will be degraded.

In another embodiment, a data storage device includes memory means and a controller coupled to the memory means. The controller is configured to manage a counter for each virtual pool of a plurality of virtual pools of the memory means, determine whether a count of the counter associated with a virtual pool equals or exceeds a first threshold value or a second threshold value, and either send a warning to one or more applications associated with the virtual pool when the count of the counter associated with the virtual pool is less than the second threshold value but greater than or equal to the first threshold value, wherein the warning indicates to the one or more applications that a health of the virtual pool will be degraded, or send an error message to the one or more applications when the count is equal to or greater than the threshold value, wherein the error message indicates to the one or more applications that the health of the virtual pool is degraded.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A is an illustration of a memory device, where a portion of the memory device is allocated to an application of a plurality of applications, according to certain embodiments.

FIG. 2B is an illustration of a memory device, where the memory device is shared between a plurality of applications, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, improving performance and endurance of a data storage device having a shared memory. A data storage device includes a memory device and a controller coupled to the memory device. The controller is configured to maintain a plurality of virtual pools, wherein each virtual pool corresponds with an logical block address (LBA) range, update a counter of a virtual pool, wherein the counter corresponds to a health of the LBA range, and select, based on the counter, the virtual pool to program data to. The controller is further configured to maintain a counter for each application having data programmed to the virtual pool, where the counter is increased for each write operation to the virtual pool. When the counter equals or exceeds a threshold value, the controller is configured to send a warning to each application associated with the virtual pool having the counter that equals or exceeds the threshold value.

Figure 1:
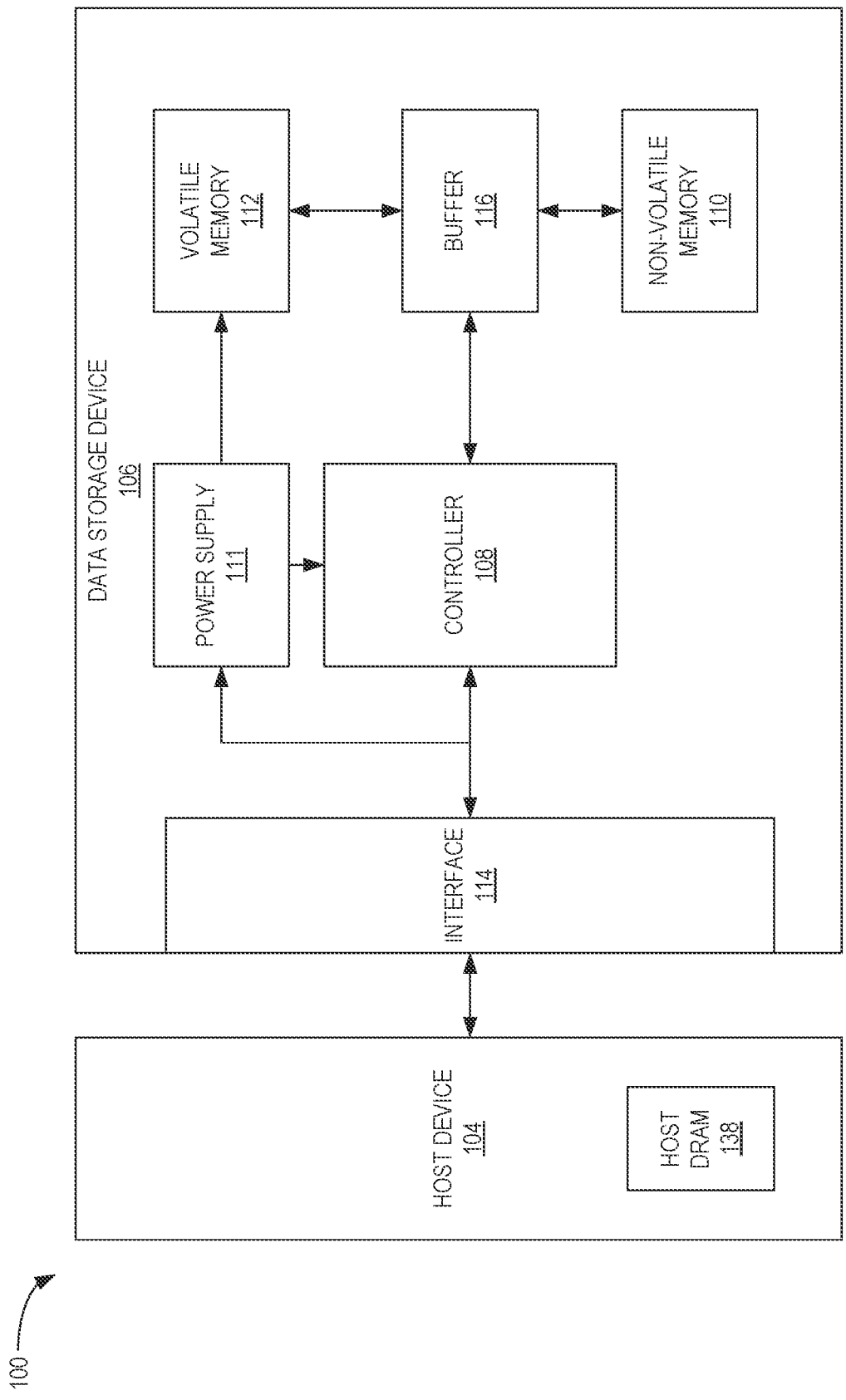
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

FIG. 2A is an illustration of a memory device 202, where a portion of a plurality of portions 204a-204n of the memory device 202 is allocated to an application of a plurality of applications (e.g., Application A-Application n), according to certain embodiments. The memory device 202 may be the NVM 110 of FIG. 1. For exemplary purposes, aspects of the storage system 100 may be referenced herein. The data storage device 106 may be coupled to a plurality of host devices and/or have a plurality of applications utilizing the memory device 202 for storage of data. The plurality of portions 204a-204n may be the same size or different sizes. Each portion may be allocated for a specific logical unit (LU)/partition/application.

When a connection is initiated between the data storage device 106 and the host device 104 or the data storage device 106 and an application, the controller 108 may allocate a portion of the plurality of portions 204a-204n to the host device 104 or the application. However, the endurance of the portion allocated may not be proportional to the size of the portion allocated. For example, the portion allocated may have size of about 1 GB, but the endurance requirement, such as a maximum terabytes written (TBW), may be about 1 GB×3 K for TLC memory, smaller than 1 GB×100 K for SLC memory, or greater than 1 GB×100 k for SLC memory. The previously listed values are not intended to be limiting, but to provide an example of a possible embodiment. Furthermore, even though SLC memory has a higher endurance than TLC memory, using more SLC memory than TLC memory may cause a loss of storage capacity for the data storage device 106. Likewise, the endurance may be affected by load balancing or, in other words, separating the memory device 202 into different physical pools for each application.

FIG. 2B is an illustration of a memory device 252, where the memory device 252 is shared between a plurality of applications (e.g., Application A-Application n), according to certain embodiments. The memory device 252 may be the memory device 202 of FIG. 2A and/or the NVM 110 of FIG. 1. For exemplary purposes, the aspects of the storage system 100 may be referenced herein. Rather than allocating a portion of the memory device 252 for a specific application or host device 104, the controller 108 may program the data of each application or host device 104 to the memory device, such that that the memory device 252 acts as a shared pool for the plurality of applications and/or host devices. In order to maintain endurance of the memory device 252, the controller 108 may implement counters for each application and/or host device. It is to be understood that the embodiments described may be applicable to logical units (LUs), where one or more LUs may be associated with an applications and/or a host device.

For example, when data of a first application is programmed to the memory device 252, the controller 108 increments a count associated with the first application. Furthermore, the memory device 252 may be partitioned into a number of virtual pools, where the virtual pools have blocks allocated from one or more memory devices having different memory architectures (e.g., SLC memory, MLC memory, TLC memory, QLC memory, and the like). Furthermore, the virtual pools may be associated with one or more logical block address (LBA) ranges. The count may be an indication of the health of the virtual pool. For example, if the count of a first virtual pool is greater than a count of a second virtual pool, then the first virtual pool may be closer to end-of-life conditions. In other words, the first virtual pool has been used more than the second virtual pool.

By having virtual pools using counters, the memory device 252 may be configured with a TBW for each application and/or LU by the controller 108 associated with the virtual pools. The controller 108 may use the counters to determine the health of the virtual pools. Each virtual pool (or rather, each application and/or LU) may be associated with a wear-out quota. In other words, based on the count of the virtual pool, the controller 108 may issue a warning to the one or more applications or LUs associated with the virtual pool. For example, the controller 108 may set a threshold count, where reaching the threshold count or exceeding the threshold count that the one or more applications or LUs may be overusing the allocated memory associated with the virtual pool or that the allocated memory associated with the virtual pool may be nearing end-of-life conditions.

The count may be based on a moving count, such as the number of counts per a period of time previously elapsed, and or a total count, such as the total number of counts from the beginning-of-life for the allocated memory. In order to maintain the counters, the data storage device 106 may additionally include ASIC hardware support that is configured by firmware to know which counters are associated with which applications and/or LBA ranges.

Referring back to FIG. 2B, the memory device 252 is associated with LU 1, LU 2, and LU x. For example, LU 1 has a wear-out quota of 10%, LU 2 has a wear-out quota of 20%, and LU x has a wear-out quota of 5%. The wear-out quota may be associated with how much of the virtual pool associated with the specific LU has been used. For example, the count of the virtual pool is an indication of how much the virtual pool has been used. When the count of the virtual pool associated with LU 1 reaches a threshold count value associated with the 10% wear-out quota, the controller 108 may issue a warning to the applications and/or hosts devices associated with LU 1 indicating that the allocated memory associated with the virtual pool may be overused or that the allocated memory associated with the virtual pool may be nearing end-of-life conditions. Similar warnings may be used for Lu 2 and Lu x.

Figure 3:
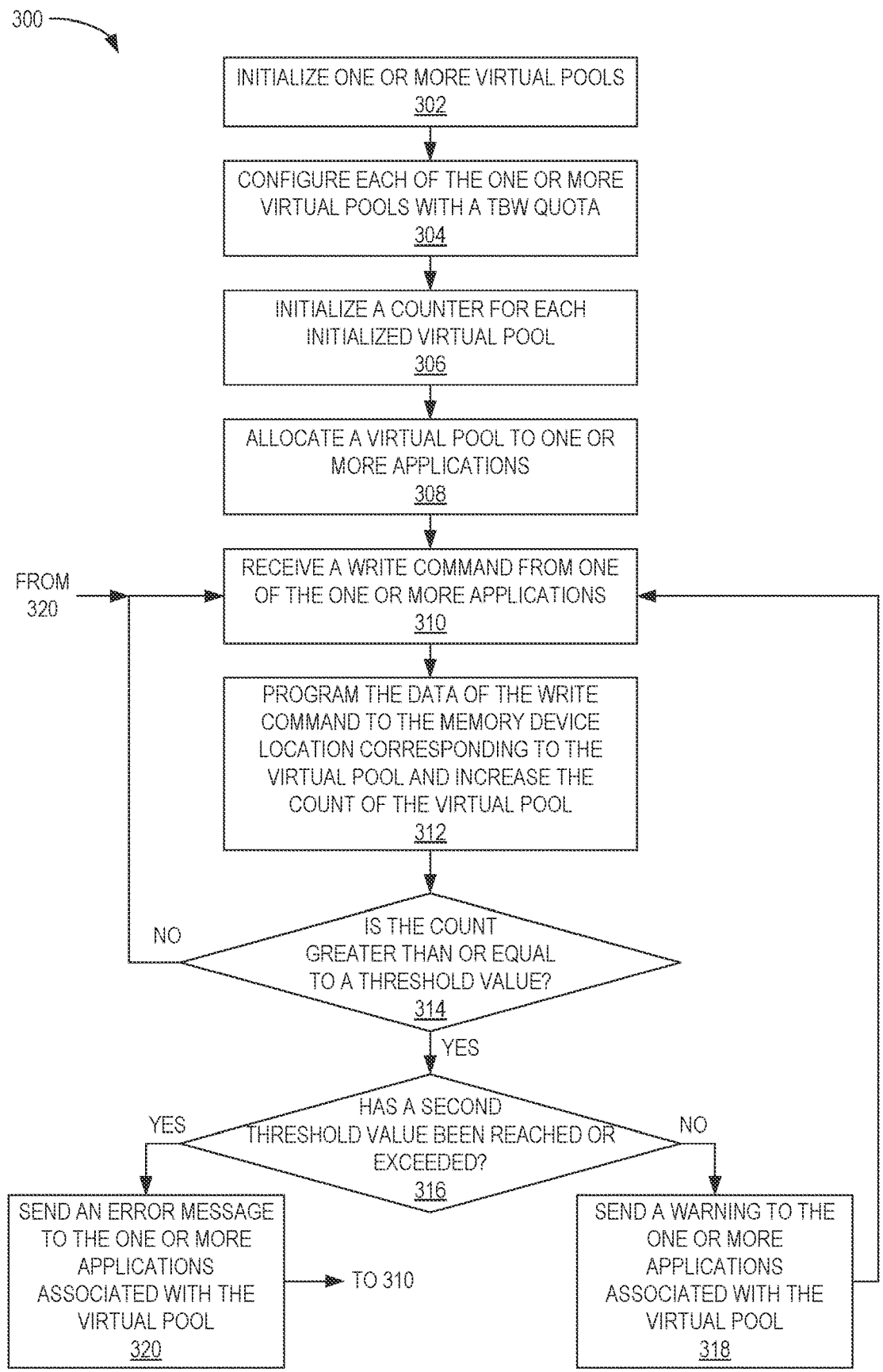
FIG. 3 is a flow diagram illustrating a method of operating a data storage device having a shared memory, according to certain embodiments.

FIG. 3 is a flow diagram illustrating a method 300 of operating a data storage device, such as the data storage device 106 of FIG. 1, having a shared memory, such as the memory device 252 of FIG. 2B, according to certain embodiments. For exemplary purposes, aspects of the storage system 100 of FIG. 1 may be referred to herein.

At block 302, the controller 108 initializes one or more virtual pools based on one or more applications associated with the one or more virtual pools. It is to be understood that the term "applications" may also be one or more host devices. At block 304, the controller 108 determines and configures a TBW threshold or quota for each of the virtual pools based on an allocated one or more LBA ranges or one or more LUs from one or more memory devices having one or more memory architectures. It is to be understood that a TBW quota may be referred to as a TBW threshold herein.

At block 306, the controller 108 initializes a counter for each initialized virtual pool. At block 308, the controller 108 allocates a virtual pool to one or more applications.

At block 310, the controller 108 receives a write command from one of the one or more applications. At block 312, the controller 108 programs the data of the write command to the memory device location corresponding to the virtual pool and increases the count of the virtual pool. At block 314, the controller 108 determines if the count is greater than or equal to a first TBW threshold value for the virtual pool associated with the programmed data. The TBW threshold value may correspond to a wear-out quota for the virtual pool, where a first TBW threshold value indicates that the corresponding virtual pool may experience health degradation soon and a second TBW threshold value indicates that the health of the corresponding virtual pool is degraded. If the count is not greater than or equal to the first TBW threshold value of the virtual pool of the programmed data at block 314, then method 300 returns to block 310. However, if the count is greater than or equal to the first TBW threshold value at block 314, then the controller 108 determines if the count is greater than or equal to a second TBW threshold value at block 316.

If the count is greater than or equal to the first TBW threshold value of the virtual pool of the programmed data at block 314, but less than the second TBW threshold value, then the controller 108 issues a warning to the one or more applications associated with the virtual pool of the programmed data at block 318. Method 300 returns to block 310 after block 318. However, if the count is greater than or equal to the first TBW threshold value of the virtual pool of the programmed data at block 314 and greater than or equal to the second TBW threshold value, then the controller 108 issues an error message to the one or more applications associated with the virtual pool of the programmed data at block 320. Method 300 returns to block 310 after block 320.

By using virtual pools rather than specifically allocated memory partitions for one or more applications and using a count to determine a health of the virtual pools, the endurance of the memory device may be improved and applications overusing the memory device may be warned ahead of time in order to protect the endurance of the memory device.

In one embodiment, a data storage device includes a memory device and a controller coupled to the memory device. The controller is configured to maintain a plurality of virtual pools, wherein each virtual pool corresponds with one or more logical block address (LBA) ranges or one or more logical units (LUs) of the memory device, update a counter of a virtual pool, wherein the counter corresponds to a health of the one or more LBA ranges or the one or more LUs, and send a warning to one or more applications associated with the virtual pool, wherein the one or more applications are associated with the one or more LBA ranges or the one or more LUs.

The controller is further configured to receive data from the one or more applications. The one or more applications are associated with a virtual pool of the plurality of virtual pools. The one or more applications corresponds to one or more host devices. Sending the warning occurs when the counter equals or exceeds a first threshold. The warning indicates to the one or more applications associated with the virtual pool that a health of the virtual pool will be degraded. The controller is further configured to send an error message to the one or more applications associated with the virtual pool when the counter passes a second threshold. The error message indicates to the one or more applications associated with the virtual pool that a health of the virtual pool is degraded. Each application of the one or more applications of the virtual pool is associated with a wear-out quota. The wear-out quota is associated with how much of the virtual pool has been utilized for the application. Updating the counter includes incrementing the counter in response to executing a write command to the virtual pool.

In another embodiment, a data storage device includes a memory device and a controller coupled to the memory device. The controller is configured to receive a write command to program data to the memory device from an application, wherein the application is associated with a virtual pool of a plurality of virtual pools of the memory device, and wherein one or more applications are associated with the virtual pool, program the data of the write command to the memory device, increase a count of a counter associated with the virtual pool, determine that the count is greater than or equal to a first threshold value, and send a warning to the application in response to determining that the count is equal to or greater than the first threshold value, wherein the warning indicates to the application that a health of the virtual pool will be degraded.

The virtual pool is associated with one or more types of memories of the data storage device. The one or more types of memories includes either a portion of single level cell (SLC) memory of the memory device, a portion of multi-level cell (MLC) memory of the memory device, a portion of triple level cell (TLC) memory of the memory device, a portion of quad level cell (QLC) memory of the memory device, or combinations thereof. The controller is further configured to configure the virtual pool with a first terabytes written (TBW) quota and a second TBW quota, wherein a TBW quota is based on the one or more types of memories associated with the virtual pool, and initialize the counter associated with the virtual pool. The first threshold value is associated with the first TBW quota. The second TBW quota is associated with a second threshold value. The controller is further configured to, when the count is greater than the first threshold value, determine whether the count is equal to or greater than the second threshold value, and send an error message to the application when the count is equal to or greater than the threshold value, wherein the error message indicates to the application that the health of the virtual pool is degraded. A different counter is associated with each virtual pool of the plurality of virtual pools. The count is either a moving count indicating a total number of counts per a period of time previously elapsed for the virtual pool or a total count indicating the total number of counts since a beginning-of-life for the virtual pool.

In another embodiment, a data storage device includes memory means and a controller coupled to the memory means. The controller is configured to manage a counter for each virtual pool of a plurality of virtual pools of the memory means, determine whether a count of the counter associated with a virtual pool equals or exceeds a first threshold value or a second threshold value, and either send a warning to one or more applications associated with the virtual pool when the count of the counter associated with the virtual pool is less than the second threshold value but greater than or equal to the first threshold value, wherein the warning indicates to the one or more applications that a health of the virtual pool will be degraded, or send an error message to the one or more applications when the count is equal to or greater than the threshold value, wherein the error message indicates to the one or more applications that the health of the virtual pool is degraded. The count of the counter associated with a virtual is incremented each time a write command associated with the virtual pool is executed.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
maintain a plurality of virtual pools, wherein each virtual pool corresponds with one or more logical block address (LBA) ranges or one or more logical units (LUs) of the memory device;
update a counter of a virtual pool, wherein the counter corresponds to a health of the one or more LBA ranges or the one or more LUs;
send a warning to one or more applications associated with the virtual pool when the counter equals or exceeds a first threshold, wherein the warning indicates to the one or more applications associated with the virtual pool that a health of the virtual pool will be degraded; and
send an error message to the one or more applications associated with the virtual pool when the counter is greater than the first threshold and equal to or greater than a second threshold, wherein:
the error message indicates to the one or more applications associated with the virtual pool that a health of the virtual pool is degraded,
the first and the second threshold are distinct, and
the one or more applications are associated with the one or more LBA ranges or the one or more LUs.

2. The data storage device of claim 1, wherein the controller is further configured to receive data from the one or more applications, wherein the one or more applications are associated with a virtual pool of the plurality of virtual pools.

3. The data storage device of claim 1, wherein the one or more applications corresponds to one or more host devices.

4. The data storage device of claim 1, wherein each application of the one or more applications of the virtual pool is associated with a wear-out quota.

5. The data storage device of claim 4, wherein the wear-out quota is associated with how much of the virtual pool has been utilized for the application.

6. The data storage device of claim 1, wherein updating the counter comprises incrementing the counter in response to executing a write command to the virtual pool.

7. A data storage device, comprising:
a memory device; and
a controller coupled to the memory device, wherein the controller is configured to:
receive a write command to program data to the memory device from an application, wherein the application is associated with a virtual pool of a plurality of virtual pools of the memory device, and wherein one or more applications are associated with the virtual pool;
program the data of the write command to the memory device;
increase a count of a counter associated with the virtual pool;
determine that the count is greater than or equal to a first threshold value;
send a warning to the application in response to determining that the count is equal to or greater than the first threshold value, wherein the warning indicates to the application that a health of the virtual pool will be degraded; and send an error message to the one or more applications associated with the virtual pool when the counter is greater than the first threshold value and equal to or greater than a second threshold value, wherein:
the first and the second threshold value are distinct, and
the error message indicates to the one or more applications associated with the virtual pool that a health of the virtual pool is degraded.

8. The data storage device of claim 7, wherein the virtual pool is associated with one or more types of memories of the data storage device, wherein the one or more types of memories comprises either:
a portion of single level cell (SLC) memory of the memory device;
a portion of multi-level cell (MLC) memory of the memory device;
a portion of triple level cell (TLC) memory of the memory device;
a portion of quad level cell (QLC) memory of the memory device; or
combinations thereof.

9. The data storage device of claim 8, wherein the controller is further configured to:
configure the virtual pool with a first terabytes written (TBW) quota and a second TBW quota, wherein a TBW quota is based on the one or more types of memories associated with the virtual pool; and
initialize the counter associated with the virtual pool.

10. The data storage device of claim 9, wherein the first threshold value is associated with the first TBW quota.

11. The data storage device of claim 9, wherein the second TBW quota is associated with a second threshold value.

12. The data storage device of claim 7, wherein a different counter is associated with each virtual pool of the plurality of virtual pools.

13. The data storage device of claim 7, wherein the count is either:
a moving count indicating a total number of counts per a period of time previously elapsed for the virtual pool; or
a total count indicating the total number of counts since a beginning-of-life for the virtual pool.

14. A data storage device, comprising:
memory means; and
a controller coupled to the memory means, wherein the controller is configured to:
manage a counter for each virtual pool of a plurality of virtual pools of the memory means;
determine whether a count of the counter associated with a virtual pool equals or exceeds a first threshold value or a second threshold value; and
either:
send a warning to one or more applications associated with the virtual pool when the count of the counter associated with the virtual pool is less than the second threshold value but greater than or equal to the first threshold value, wherein the warning indicates to the one or more applications that a health of the virtual pool will be degraded; or
send an error message to the one or more applications when the count is greater than the first threshold value and equal to or greater than the second threshold value, wherein:
the first and the second threshold value are distinct, and
the error message indicates to the one or more applications that the health of the virtual pool is degraded.

15. The data storage device of claim 14, wherein the count of the counter associated with a virtual is incremented each time a write command associated with the virtual pool is executed.

* * * * *